April 4, 1967  H. D. FOWLER  3,312,426
CONVERTIBLE VTOL AIRCRAFT
Filed July 13, 1966  3 Sheets-Sheet 1
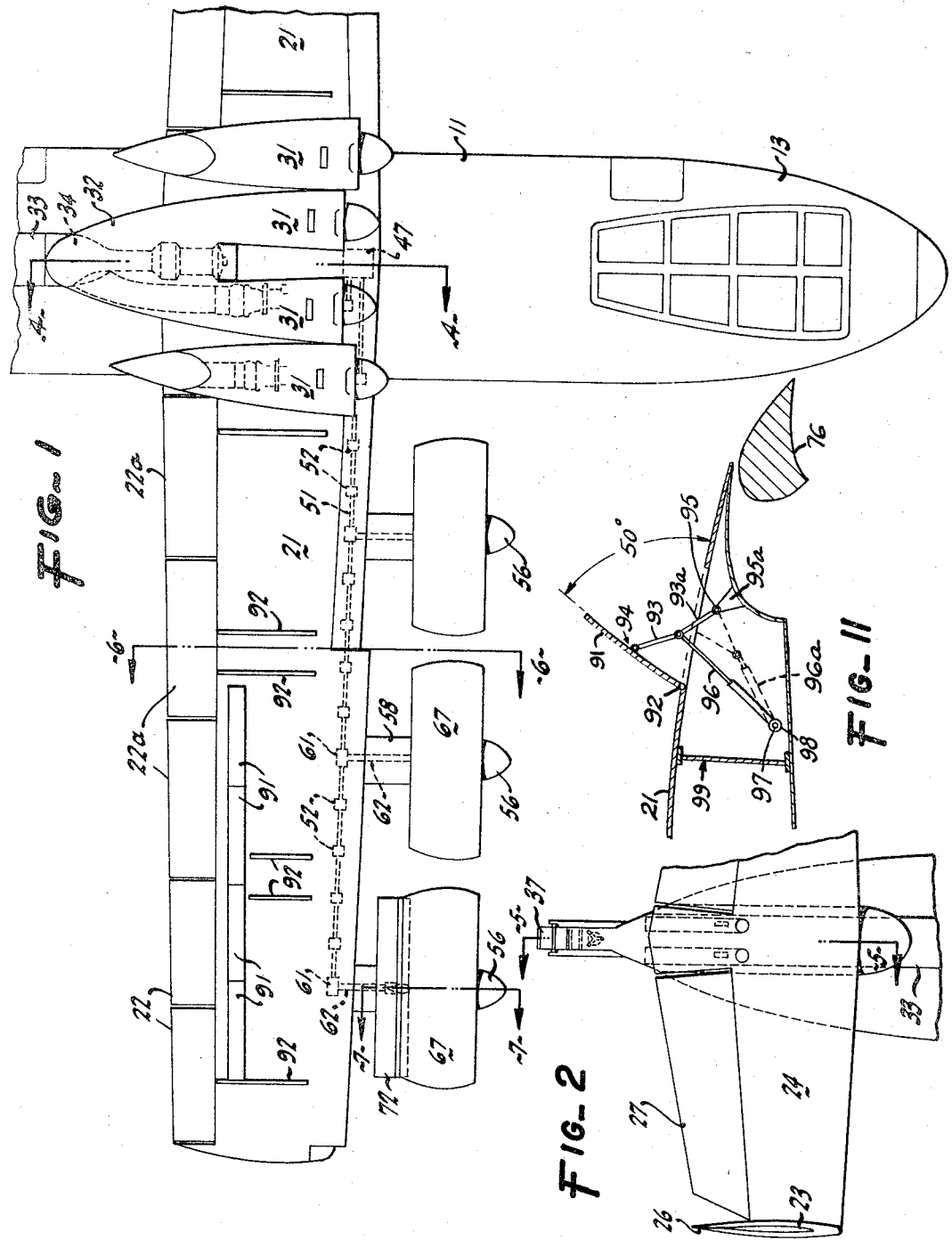
INVENTOR.
HARLAN D. FOWLER
BY
Julian Caplan
ATTORNEY

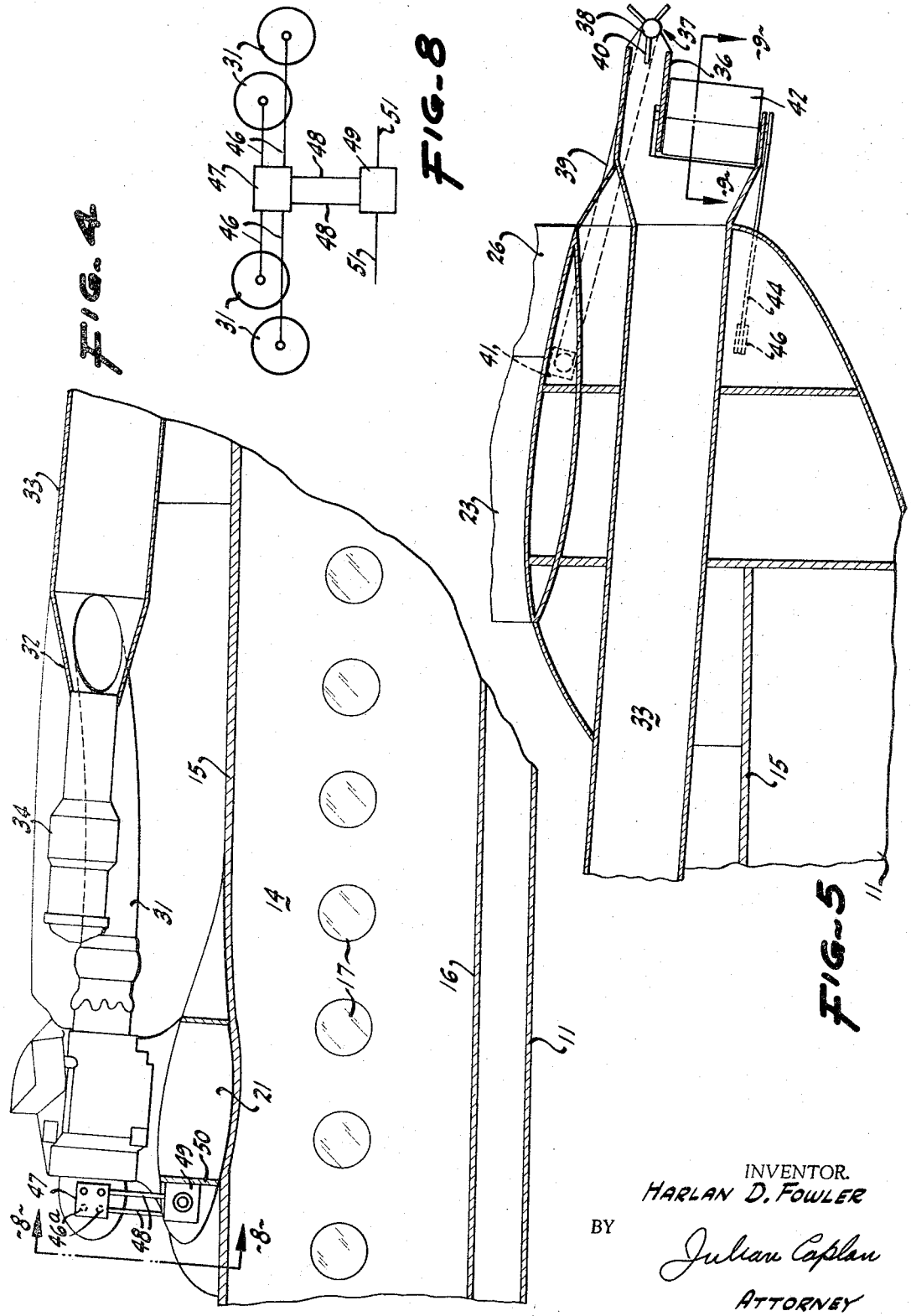

April 4, 1967
H. D. FOWLER
3,312,426
CONVERTIBLE VTOL AIRCRAFT
Filed July 13, 1966
3 Sheets-Sheet 3
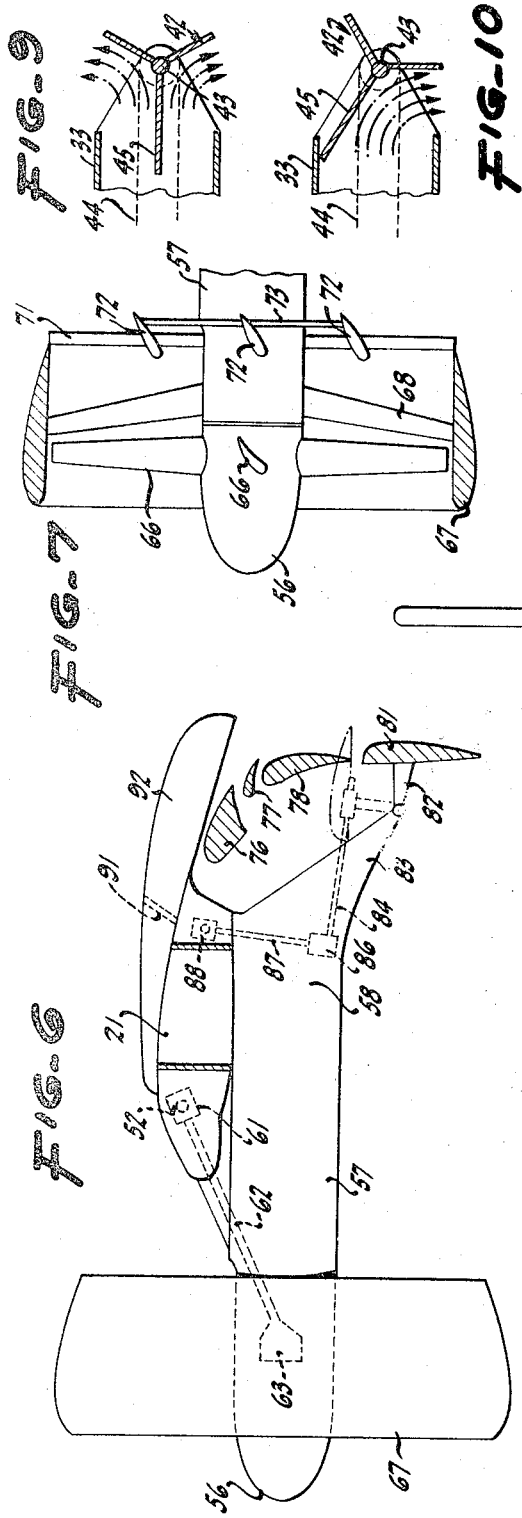
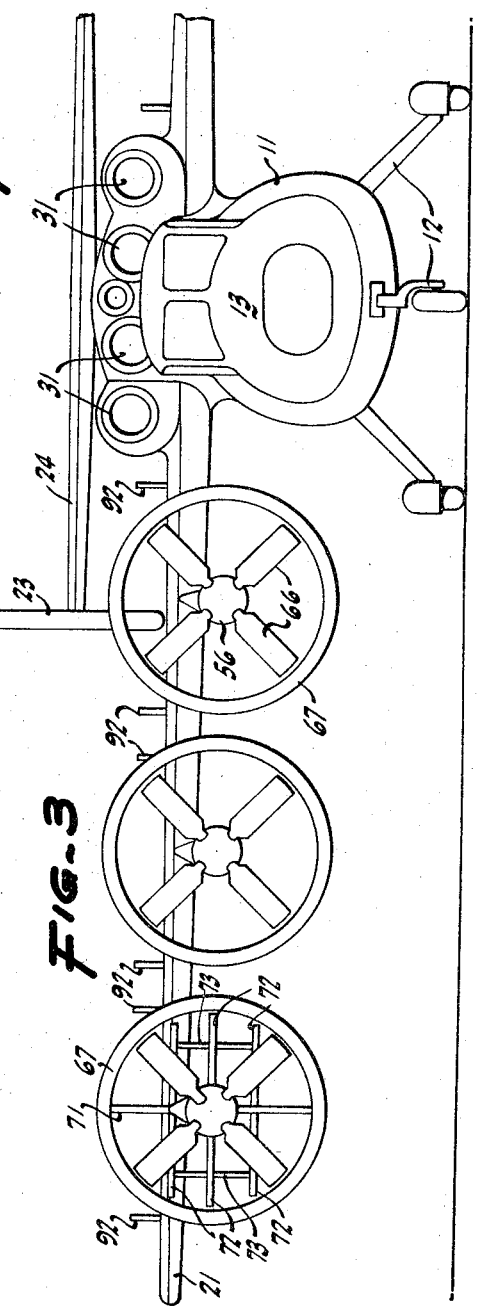
INVENTOR.
HARLAN D. FOWLER
BY
Julian Caplan
ATTORNEY 3,312,426
CONVERTIBLE VTOL AIRCRAFT
Harlan D. Fowler, P.O. Box 304,
Burlingame, Calif. 94010
Filed July 13, 1966, Ser. No. 564,885
20 Claims. (Cl. 244—12)

This invention relates to a new and improved convertible VTOL aircraft. More particularly, the invention provides an aircraft which can be converted from a conventional to a deflected slipstream VTOL aircraft.

One feature of construction is use of a series of shrouded propellers. For example, two, four or six propellers may be spaced along the wing span, depending upon the gross weight of the aircraft. In a preferred form of the invention the shrouded propellers are driven through a transmission shaft system connected to engines located on the top of the fuselage above the wing. A feature of the invention is the fact that the swing is fixed as distinguished from tiltable wing aircraft and hence the engines can be mounted over the wing and fuselage.

A further feature of the invention is a very simplified means for controlling the deflection of the propeller slipstream thrust by the use of a small tiltable auxiliary wing or deflector pivotally mounted to the extreme rear of each propeller nacelle.

Means is provided for adjusting the horizontal location of the auxiliary wing or slipstream deflector below the conventional monoplane wing and the rearward vertical location below the trailing edge of the deflected flaps. The angle of attack of this deflector may be varied from approximately 0° at the horizontal location, through an intermediate angle of attack of 45°, to the extreme vertical angle of 90°. As a consequence, the lift increases to a maximum and then falls off to zero at 90° and the drag increases with increasing angle of attack until it reaches a maximum value at 90°.

The auxiliary wing or slipstream deflector is caused to rotate about the rearmost point of the propeller nacelle by a short-length linear actuator pivotally secured to the leading edge of the deflector and to a gear box from which a vertical shaft rises to the rear of the rear spar of the monoplane wing. Another gear box is operated by a long transverse main shaft running spanwise of the wing. Preferably, an auxiliary deflector is used for each propeller and by appropriate drive mechanism the transverse shaft may be used to control the actuators for each deflector. Slotted flaps may be used on the wings and the same transverse shafting may be used to deflect the slotted flaps and thus coordinate their movement with the deflector. A single power source may be located at the fuselage to drive all of the auxiliary wings and slotted flaps.

As hereinafter explained in detail, to attain VTOL, the propeller slipstreams are caused to turn from horizontal to vertical when the flaps and deflectors are set at approximately 90°. However, by setting the deflector at approximately 45°, a substantial increase in drag is achieved to attain the desired glide angle of descent on approach flight for landing. As a final improvement, the deflector may be deflected to 90° after the wheels touch the ground to abruptly increase the drag to retard the speed of the airplane when making a short landing or STL. This procedure is a substitute for reverse thrust of propellers. Shrouded propellers cannot be operated with reverse thrust due to the physical shape of the shroud and accordingly the present invention provides some of the benefit of reverse thrust of propellers while still making possible the use of shrouded propellers.

A further feature of the invention is the use of fences fixed to the upper surface of the monoplane wing at spanwise positions approximately directly in line with the exit edges on each side of each shroud. The maximum height of such fences is approximately 15% of the wing chord at the trailing edge of the wing, tapering off to mere zero toward the leading edge of the wing. The purpose of the fences is to prevent lateral displacement of the slipstream boundary and thus insure confining the slipstream flow over the wing where it will be the most effective. When properly placed and positoned, the fences will increase the lift over thrust ratio and also the turning angle of the aircraft under VTOL operation.

Where multiple shrouded propellers are used, a fence is mounted approximately in line with the inner edge of the inboard shroud and another fence mounted approximately in line with the outer edge of the outboard shroud. This arrangement confines the slipstream boundary within the wing span occupied by two or more shrouded propellers on both sides of the fuselage.

A principal feature of the invention is to concentrate the weight of the heavy engines near the center of gravity along the line of symmetry of the aircraft, leaving only the weight of the shrouded propellers and supporting nacelles mounted spanwise in the wing. This tends to minimize the moment of inertia about the roll, pitch and yaw axes. In turn, this reduces to a minimum the required augmented forces to stabilize the aircraft under static VTOL operation.

A further object of the invention is to utilize the exhaust thrust from the engines through a duct system to the tail of the fuselage, where its force can be directed by means of vanes to control the pitch and yaw moments with no loss of power from the engines that is usually required to drive a tail propeller for similar control purposes.

In a preferred form of the invention, roll control is obtained by using spoilers on the wing and vanes in the outboard shrouded propellers combined with differential propeller pitch. Any reduction of power not required by the differential pitch or reduced thrust of the propeller is returned back into the propulsion system through the transmission shaft system. Thus the over-all power for driving all the propellers remains essentially constant. These advantages are not attainable in a tilt wing where the engines must be mounted spanwise along the wing and interconnected to each other but not to the over-all system.

A further object of the invention is to use two interconnecting engines over the fuselage and wing to drive four shrouded propellers or four interconnected engines to drive six shrouded propellers. An advantage of this feature is that it permits using smaller diameter propellers than would be the case if each engine drove only one propeller.

A still further advantage of the invention is the fact that powerful interconnected engines may be used to develop sufficient thrust to lift the aircraft off the ground without greatly enlarging the number of propellers or engines. In tilt wing aircraft, an engine is used for each conventional propeller although the engines are interconnected. Efficient operation of the aircraft and servicing demands as few engines as possible. Thus, the present invention satisfies such demand but achieves superior results as contrasted with tilt wing aircraft.

Another advantage of the concentration of the engines over the fuselage and wing is the simplification of the control system for the power plant near one location and not far from the pilot's cockpit.

Another advantage of the invention is the fact that the inboard shrouds act as barriers in the event of propeller blade failure and thereby prevent the blade from penetrating the fuselage and thus permit seating passengers in the line of the propeller, as distinguished from conventional aircraft wherein governmental regulations prohibit such passenger seating.

The present invention results in reduced weight, simplified static control system, reduced noise (due to shrouded propellers) and economical operation over short distances.

Other objects of the present invention will become apparent upon reading the following specification and referring to the accompanying drawings in which similar characters of reference represent corresponding parts in each of the several views.

In the drawings:

FIG. 1 is a top plan view partially broken away to conserve space of the forward end of the fuselage and one wing constructed in accordance with the present invention.

FIG. 2 is a fragmentary top plan view of a portion of the tail structure thereof.

FIG. 3 is a fragmentary front elevation thereof.

FIG. 4 is a fragmentary longitudinal vertical sectional view taken substantially along the line 4—4 of FIG. 1.

FIG. 5 is a fragmentary vertical sectional view taken substantially along the line 5—5 of FIG. 2.

FIG. 6 is a fragmentary transverse sectional view taken substantially along the line 6—6 of FIG. 1.

FIG. 7 is an enlarged fragmentary sectional view taken substantially along the line 7—7 of FIG. 1.

FIG. 8 is a schematic view of the power transmission system.

FIG. 9 is a fragmentary horizontal sectional view taken substantially along the line 9—9 of FIG. 5 showing the deflector vanes in neutral position.

FIG. 10 is a view similar to FIG. 9 showing the vanes for deflected position.

FIG. 11 is a schematic sectional view showing spoiler control.

One feature of the invention is the fact that more or less conventional air frame construction may be employed. Thus the present invention employs a fuselage 11 supported by ground wheels 12 having a cockpit 13 and a cabin 14 having a floor 16 on which passenger seats (not shown) may be mounted and ceiling 15 and further provided with windows 17 and other normal passenger seating and servicing appurtenances and baggage and cargo storage areas.

Extending from the top of fuselage 11 are monoplane wings 21 provided with slotted inboard flaps 22a and slotted outboard flaps 22 with differential deflections as large as 75° inboard and 50° outboard. At the tail are vertical and horizontal stabilizers 23, 24, provided with rudders and elevator 26, 27. In the foregoing respects, this invention resembles conventional aircraft, an important advantage in its design.

In a preferred form of the invention, the main power system of the aircraft is provided by a turboshaft type of engine 31. In the form of the invention illustrated herein, four engines 31 are mounted above wing 21 as close as possible to the fuselage 11. The exhaust of the two inboard engines 31 is collected by a duct 32 and transmitted by a longitudinally extending duct 33 to the tail of the aircraft. In the event of failure of one of the inboard engines 31, a fifth or auxiliary turbo-fan engine 34 operates simultaneously during VTOL flight to supply additional exhaust force through duct 33 for emergency purposes. At the tail of the aircraft a horizontal partition 36 is provided dividing the exhaust into two parts. The upper part of the exhaust above partition 36 encounters a vaned deflector 37 which is rotatably mounted in duct 33 at the tail about a horizontal transverse pivot axis 38 and controlled by cables 39 from a control 41 subject to cockpit actuation (not shown). There are three vanes spaced 120° apart, the inside vane 40 in the duct being longer than the outside vanes. When the vanes are in the neutral position shown in FIG. 9, the exhaust gas forced past them is split and divided equally. However, for pitch control, the vanes 37 may be rotated about axis 38, the longer internal vane 40 blocking off the flow at one side, to cause the exhaust force to lift or drop the tail, and thus force the aircraft into a pitch-down or a pitch-up attitude.

Similarly, below the partition 36 the exhaust gases encounter deflector 42 which has three vanes spaced 120° apart. The inside vane 45 is the longer. As best shown in FIG. 9, deflector 42 is mounted about a vertical axis 43, controlled by cables 44 and actuator 46a. In the position shown in FIG. 9, the exhaust gases are equally divided to either side of vane 45 and neutralized. However, when the deflector 42 is rotated 30° to the position shown in FIG. 10, the gases are deflected to one side, thereby accomplishing yaw control. The control cables 39 and 44 may be interconnected to the controls for elevator 27 and rudders 26 by means not shown but which will readily occur to one skilled in this art.

In a preferred transmission system best shown in FIG. 8, each of the four engines 31 turns individual drive shafts 46 extending substantially horizontally to a central gear box 47, from which depend four vertical drive shafts 48 leading to a second gear box 49 which is at the level of the front spar 50 of wing 21. In gear box 49 are over-running clutches (not shown) which enable any engine to be disengaged from the transmission system in the event of its failure. Leading from gear box 49 are horizontal transverse transmission shafts 51 extending spanwise along wings 21. Preferably at intervals flexible couplings or universal joints 52 are provided to prevent seizure or breakage of the shaft due to flexure of the wings. The total power concentrated within gear box 49 is equally available to all propellers by automatic adjustment of the pitch of each propeller. A reduction in power in one of the outer propellers reverts back through the transmission shaft system to gear box 49, and can be distributed to all the remaining propellers whose blade pitch is automatically increased to absorb the increased power.

A feature of the invention is the fact that the propellers are not driven by individual engines. As illustrated herein, there are four engines 31 and said engines drive six propellers 56. It will be understood, however, that more or fewer propellers and engines may be used in combination. Each propeller 56 is supported by forward extending portion 57 of centerbody 58 suspended below and forwardly of wing 21. The drive for each propeller 56 provides individual gear boxes 61 in the wing having downwardly forwardly directed shafts 62 connected to gear box 63 in the centerbody 58 and arranged to drive the propeller 56. The size of shafts 51 may diminish between the inner and center propeller and again between the center and outer propeller in proportion to the decrease of power absorbed by the propellers.

In the form of the invention herein illustrated, each propeller 56 has four blades 66 which are relatively short and preferably are of variable pitch, the pitch control not being illustrated but being well understood in the aircraft art. It will be understood that the number of blades is subject to variation. In a preferred form of the invention, each propeller 56 is provided with a shroud 67 of airfoil configuration as well understood in the art, the shroud 67 being supported from centerbody 58 by struts 68.

However, standard propellers without shrouds may be used, depending on the weight of the aircraft and the power used.

In a further preferred embodiment of the invention, the outboard shrouded propeller 56 is provided with vanes. Thus a vertical support 71 is provided at the rear of the shroud 67 extending from centerbody 58. Horizontal vanes 72 are pivotally mounted on support 71 and to the outer sides of shroud 67, there being three such vanes 71 in the form of the invention herein illustrated. Tie rods 73 connect the upper and lower vanes 72 with the central vane so that the three vanes move together. By means not shown but well understood in the art, the central vane may be caused to deflect from neutral position to deflected position. Preferably, the cross-section of vanes 72 is streamlined. Deflecting the vanes 72 up on one outer shrouded propeller and down on the opposite outer shrouded propeller will cause the aircraft to roll.

Directing attention particularly to FIG. 6, for each shrouded propeller 56 there is provided a slotted flap system indicated by reference numerals 76, 77, 78. Sections 76, 77, 78 may be retracted into the wing 21, which is provided with a suitable opening therefor. In the projected position illustrated in FIG. 6, however, the combined effect of the flap sections 76, 77, 78 is to deflect the slipstream of the propeller 56 downwardly. The means whereby the flap section 76, 77, 78 are retracted and projected and actuated is not herein illustrated but is well understood in this art.

A feature of the present invention is provision of a pivotal or tiltable auxiliary wing or deflector 81 which in the solid line position illustrated in FIG. 6 is immediately below and comprises an extension of flat system 76, 77, 78 so that the slipstream is deflected 90° or downwardly to facilitate vertical takeoff. In inoperative position illustrated in dotted lines in FIG. 6, the deflector wing 81 is substantially horizontal. At an intermediate position of 45° approximately, the deflector wing 81 increases the drag sufficiently to improve the glide angle on the approach to a landing, with partial power-on, thereby augmenting the effects of the flap system 76, 77, 78, which preferably is in the fully extended position. Deflector wing 81 is mounted by means of bracket 82 to a downward-rearward projection 83 of centerbody 58. Actuation of deflector wing 81 may be through actuator drive shaft 84 which projects forwardly upwardly to a gear box 86 in centerbody 58 from which extends a substantially vertical shaft 87 connected to transverse horizontal shaft 88. Shaft 88 may be used to actuate the flap system 76, 77, 78, as well as deflector wing 81 if desired. Shaft 88 extends to the fuselage 11 and is power-driven and controlled therein.

For further roll control on the aircraft, spoilers 91 are mounted on the top surface of wing 21 adjacent the trailing edge thereof and outboard of the fuselage. In retracted position, spoilers 91 merge with the top surface of wing 21. In their projected position shown in dotted lines in FIG. 6, they extend upwardly thereby destroying the lift of the wing on its side of the wing, while on the opposed side of the wing the spoiler is retracted and the lift is normal, the combined effect is to cause unequal lift over the span of the wing and thus cause the aircraft to roll. Spoiler control is by any conventional means, such as that shown in FIG. 11. The front edge of spoiler 91 is hinged at 92. Linkage rod 93 is hinged to spoiler 91 at 94 and rod 93a at 95 to bracket 95a. The inner ends of rods 93, 93a are pivoted to the outer end of screw 96 of screw jack 96a, which is driven by spur gear 97 secured to transverse drive shaft 98 located aft of rear spar 99. Shaft 98 extends to the fuselage 11 and is power driven thereat by conventional means. The spoiler system is mounted on wing 21 with flap portion 76 shown in extended position.

To confine the slipstream of propellers 56 in a spanwise sense, fences 92 are provided. As best shown in FIG. 1, there is a fence 92 immediately outboard and another fence immediately inboard of each shrouded propeller. At the trailing edge of the wing the height of the fence 92 is approximately 15% of the chord of the wing and at the forward edge of the fence it merges with the top of the wing.

For conventional operation of the aircraft, engines 31 drive propellers 56 through the transmission system which has heretofore been described. For short takeoff, flap sections 76, 77, 78 are projected to one-half position. Deflector wing 81 is positioned in the horizontal position. In flight, the vanes 72 on one of the outboard shrouded propellers are deflected upwardly which combined with projected spoilers 91 causes less lift on that side, whereas at the opposed shrouded propeller the vanes 72 are deflected downward and the spoilers 91 are retracted causing an increase of lift, the combined effect resulting in a rolling movement of the aircraft to the side where loss of lift occurs. While the combined use of vanes 72 and spoilers 91 are effective at high cruise speeds, their effect in roll control is relatively low at very low speeds customarily found during V/STOL operations. To improve this condition, it is desirable to use differential propeller pitch control at the outer propeller. This is accomplished by decreasing the pitch of propeller 66 and thereby causing decreased thrust and dynamic pressure within the slipstream, thus causing loss of lift over that portion of the outer wing behind said outer propeller. This effect combined with loss of lift from the upward deflected vanes 72 and the loss of lift from the projected spoilers 91 can result in powerful roll control.

It is to be noted that conventional ailerons are not used in the invention's present concept of lateral control.

Conventional pitch and yaw control from the tail surfaces may be supplemented by the vanes 37 and 42 as has heretofore been described.

On approach to landing, the flap system 76, 77, 78 is fully projected and the auxiliary wing 81 placed in mid or 45° position. After the wheels are on the ground the deflector 81 may be placed in full down 90° position to accomplish a high drag effect similar to the reversal of thrust of conventional aircraft propellers.

In VTOL operation, the flap system 76, 77, 78 is fully projected and the auxiliary wing 81 is also in fully projected downward position. The slipstreams of the propellers are therefore directed straight vertically-downwardly. The same positioning is used in vertical landing as in vertical takeoff.

Certain theoretical considerations affecting the structure heretofore described and its operation are in order.

With respect to use of shrouded propellers, the static thrust of a given size propeller is approximately doubled by enclosing the blade tips in a shroud, and the dynamic pressure within the slipstream is increased by two. Thus for the same power delivered to the propeller, a shrouded propeller will lift twice the weight of a conventional one when employed in the manner previously disclosed. A principal value of this effect, when considered in the light of this invention, however, is that it permits a reduction in propeller diameter. This, in turn, permits a reduction in the span of the wing, yet a higher lifting capacity is obtained from a given power source. Reduction in wing span reduces not only the weight of the propulsion system, but also the weight of the wings, flaps and deflectors. The weight of this shrouded propeller system is less than the weight of the larger diameter conventional propeller system producing the same static thrust.

Reduction in propeller diameter is of particular importance in a deflected slipstream VTOL aircraft. Calculation and test show an increase in lift, wing drag and deflector drag for smaller diameter shrouded propellers as compared with larger diameter conventional propellers. The turning angle Theta is considerably higher which results in a lower angle of attack of the fuselage, the combined angle being 90°. When several propellers are used, the beneficial effect is correspondingly augmented.

The deflector wing has a further advantage in STOL.

By setting the deflector wing at about 45°, the angle of glide on an approach landing is controlled because sufficient drag is contributed to obtain the optimum net thrust with power on.

The use of such deflector wing overcomes one of the disadvantages of shrouded propellers. The shroud has an airfoil cross-section and thus a sharp exit edge. If a reverse thrust is imparted to the propeller, the effect of reversing conventional propellers is not achieved because of the sharp exit edge (which is now the entrance edge). By deflecting the deflector wing full down on STOL landing as soon as the plane touches the ground, the drag of the deflector wing slows the speed on the runway and obtains an effect similar to reverse propeller thrust.

Accordingly the deflector wing serves three distinct purposes: To obtain VTOL, to gain good STOL performance on approach, and to gain good STOL performance on landing.

Although the foregoing invention has been described in some detail, by way of illustration and example for purposes of clarity of understanding, it is understood that certain changes and modifications may be practiced within the spirit of the invention and scope of the appended claims.

What is claimed is:

1. In a V/STOL aircraft, a fuselage, a wing extending to either side of said fuselage, at least two engines mounted centrally of said aircraft above said wing and on opposite sides of said fuselage and outside said fuselage, at least one centerbody on each side of said wing, a propeller mounted on said centerbody, a transmission system from said engines, along said wings to drive said propeller, a slotted flap movable between retracted position and projected position, each said wing heaving a cavity to receive said flap in retracted position, a rigid, pivotal deflector wing, and means pivotally mounting said deflector wing on the rearmost end of said centerbody for pivotal movement between a retracted, substantially horizontal position and a projected substantially vertical position, said flap and deflector wing when both in projected position forcing the slipstream of said propeller substantially downward.

2. An aircraft according to claim 1 in which said deflector wing when in projected position is substantially vertical and directly below the lower edge of said flap when said flap is in projected position.

3. An aircraft according to claim 1 which further comprises a shroud encircling the tips of said propeller and struts supporting said shroud from said centerbody.

4. An aircraft according to claim 3 in which said propeller and shroud are forward of said wing, part of the slipstream of said propeller directed over and part under said wing, said deflector wing projecting vertically immediately below the trailing edge of said wing and of said flap when said deflector wing and flap are in projected position to force said slipstream substantially downward.

5. An aircraft according to claim 3, which further comprises a first fence on top of said wing substantially in line with the inboard edge of said shroud and a second fence on top of said wing substantially in line with the outboard edge of said shroud, said fences each having maximum height substantially above the maximum contour of the wing.

6. An aircraft according to claim 5, in which each said fence has its maximum height above said wing adjacent the trailing edge of said wing, said height approximately 15% of the wing chord, said fence height tapering off forwardly toward the leading edge of said wing.

7. An aircraft according to claim 3, which further comprises a vertical support extending from top to bottom at the rear of said shroud, a plurality of transverse vanes, and means pivotally mounting said vanes on said support for movement between a horizontal position and a deflected position to the horizontal.

8. An aircraft according to claim 7, which further comprises a spoiler on said wing, said propeller having variable differential pitch, control means for said spoiler and said vanes and said spoiler being within the slipstream of said propeller.

9. An aircraft according to claim 1, in which said propeller is of variable differential pitch.

10. An aircraft according to claim 1, in which said deflector wing is movable to a third position intermediate retracted and projected positions, said third position extending downward-rearward at about 45° to slow the approach of said aircraft on standard landing.

11. An aircraft according to claim 1 which further comprises at least one additional propeller mounted on each side of said wing, the number of engines being less than the number of propellers, said propellers being shoulded and of differential pitch, said transmission system interconnecting said engines with all said propellers, whereby upon reduction in thrust in an outer propeller through adjustment of pitch, excess power from any of said engines is transmitted to the other said propellers.

12. An aircraft according to claim 1 in which said fuselage has a cabin and which further comprises a duct on top of said fuselage cabin receiving the exhaust of both said engines and conducting the exhaust to the tail of said fuselage, a deflector having three equi-angularly spaced vanes at the rear of said duct, and means for adjusting the position of said deflector from a position in line with said duct to a position oblique to said duct.

13. An aircraft according to claim 12 in which said deflector is pivotally mounted about a vertical axis to control yaw of said aircraft.

14. An aircraft according to claim 12 in which said deflector is pivotally mounted about a horizontal axis to control pitch of said aircraft.

15. The aircraft according to claim 12 which further comprises at least one additional engine, the discharge of at least two engines received in said duct and an auxiliary engine pushing exhaust gases rearwardly in said duct.

16. In an aircraft, a fuselage having a cabin, a wing extending to either side of said fuselage, at least two engines mounted centrally of said aircraft above said wing and outside said fuselage, at least two centerbodies spaced along each side of said wing, propellers rotatably mounted in said centerbodies about fixed horizontal axes, and a transmission system for driving each of said propellers from each of said engines, the number of said propellers being greater than said engines, said transmission system including a central gear box driven by all of said engines, a pair of transmission shafts driven from said central gear box, one said shaft extending along said wing on either side of the fuselage and driving all of the propellers on said side.

17. In an aircraft, a fuselage, a wing extending to either side of said fuselage, at least two engines mounted centrally of said aircraft outside said fuselage, propellers for said aircraft, center bodies mounting said propellers on said wings, shrouds encircling the tips of said propellers, struts supporting said shrouds on said center bodies, transmission means for driving said propellers from said engine, a duct receiving the exhaust of at least two said engines and conducting the exhaust to the tail of said fuselage, a deflector having three equi-angularly spaced vanes at the rear of said duct, and means for adjusting the position of said deflector from a position in line with said duct to a position oblique to said duct.

18. An aircraft according to claim 17 in which said deflector is pivotally mounted about a vertical axis to control yaw of said aircraft.

19. An aircraft according to claim 17 in which said deflector is pivotally mounted about a horizontal axis to control pitch of said aircraft.

20. An aircraft according to claim 17 which further comprises at least one additional engine, the discharge of at least two engines received in said duct and an auxiliary engine pushing exhaust gases rearwardly in said duct.

References Cited by the Examiner

UNITED STATES PATENTS

| | | | |
|---|---|---|---|
| 2,445,446 | 7/1948 | Mas | 244—55 X |
| 2,479,619 | 8/1949 | Hilton et al. | 244—42 |
| 2,991,026 | 7/1961 | Nelson et al. | 244—12 |
| 3,093,347 | 6/1963 | Fowler | 244—12 |
| 3,096,043 | 7/1943 | La Bussiere | 244—12 |
| 3,106,369 | 10/1963 | Borst | 244—7 |
| 3,121,544 | 2/1964 | Alvarez-Calderon | 244—60 X |

MILTON BUCHLER, *Primary Examiner.*

ALFRED E. CORRIGAN, *Examiner.*